(12) United States Patent
King

(10) Patent No.: US 10,561,263 B2
(45) Date of Patent: Feb. 18, 2020

(54) ABSORBENT PAD HOLDER AND CONTAINMENT SYSTEM

(71) Applicant: SAK GROUP LLC, Placentia, CA (US)

(72) Inventor: Steven King, Placentia, CA (US)

(73) Assignee: SAK GROUP LLC, Placentia, CA (US)

( * ) Notice: Subject to any disclaimer, the term of this patent is extended or adjusted under 35 U.S.C. 154(b) by 263 days.

(21) Appl. No.: 15/838,116

(22) Filed: Dec. 11, 2017

(65) Prior Publication Data

US 2018/0160834 A1 Jun. 14, 2018

Related U.S. Application Data

(60) Provisional application No. 62/433,077, filed on Dec. 12, 2016.

(51) Int. Cl.
*A47G 27/04* (2006.01)
*A47G 27/02* (2006.01)
*A01K 1/01* (2006.01)

(52) U.S. Cl.
CPC ........ *A47G 27/0431* (2013.01); *A01K 1/0107* (2013.01); *A01K 1/0125* (2013.01); *A47G 27/0206* (2013.01); *A47G 27/0412* (2013.01)

(58) Field of Classification Search
CPC ........... A47G 27/0431; A47G 27/0206; A47G 27/0412; A01K 1/0107; A01K 1/0125; A01K 1/015; A01K 1/0152; A01K 1/0157; A01K 1/0353

USPC ....... 119/161, 165, 167, 168, 169, 170, 171; 248/346.03, 346.06, 346.07; 206/204, 206/565, 560

See application file for complete search history.

(56) References Cited

U.S. PATENT DOCUMENTS

| | | | |
|---|---|---|---|
| 3,827,401 A * | 8/1974 | Franzl ................ | A01K 1/0107 119/169 |
| 5,355,837 A | 10/1994 | Reyes | |
| 6,059,247 A | 5/2000 | Olivadoti | |
| 6,550,423 B1 | 4/2003 | Pope | |
| 7,128,023 B2 | 10/2006 | Otsuji et al. | |
| 8,113,146 B2 | 2/2012 | Kskinasi | |
| 8,220,622 B1 | 7/2012 | Lewis et al. | |
| 8,656,863 B2 * | 2/2014 | Havluciyan .......... | A01K 1/0107 119/165 |
| 2001/0025910 A1 * | 10/2001 | Olivadoti ............. | A01K 1/0107 248/346.01 |
| 2003/0094140 A1 * | 5/2003 | Otsuji ................. | A01K 1/0107 119/169 |

(Continued)

*Primary Examiner* — Trinh T Nguyen
(74) *Attorney, Agent, or Firm* — Innovation Capital Law Group, LLP; Vic Lin

(57) ABSTRACT

An absorbent pad holder and containment system includes a frame that can be adjustable in length on all sides to accommodate a varying range of absorbent pad dimensions. The frame design allows the absorbent area of the pad to remain flat while the ramped perimeter design of the frame and the corner attachment system holds the outer edge of the absorbent pad into an upward position. This creates a containment barrier for liquid that would normally flow over the edge of the pad and onto the floor surface. The perimeter design of the liner keeps the pad centered and provides flow of all liquid landing on the pad within the absorbent area of the pad.

20 Claims, 15 Drawing Sheets

(56) References Cited

U.S. PATENT DOCUMENTS

| | | | |
|---|---|---|---|
| 2008/0105208 A1 | 5/2008 | Hamrick | |
| 2013/0171597 A1* | 7/2013 | Kong | A01K 1/0107 |
| | | | 434/247 |
| 2014/0338608 A1* | 11/2014 | Williams | A01K 1/0125 |
| | | | 119/168 |
| 2014/0360436 A1* | 12/2014 | Kong | A01K 1/0107 |
| | | | 119/163 |
| 2016/0242384 A1* | 8/2016 | Huntinghouse | A01K 1/0125 |
| 2016/0302380 A1 | 10/2016 | Hasegawa et al. | |
| 2018/0110199 A1* | 4/2018 | Venezio | A01K 1/0125 |

\* cited by examiner

ABSORBENT PAD HOLDER AND CONTAINMENT SYSTEM

CROSS-REFERENCE TO RELATED APPLICATIONS

This application claims the benefit of priority to U.S. provisional patent application No. 62/433,077, filed Dec. 12, 2016, the contents of which are herein incorporated by reference.

BACKGROUND OF THE INVENTION

1. Field of the Invention

Embodiments of the invention relates generally to liquid or spill containment. More particularly, the invention relates to an absorbent pad holder that allows the absorbent area of an absorbent pad to remain flat while the ramped perimeter design of the frame and the corner attachment system holds the outer edge of the absorbent pad into an upward position.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Absorbent pads are designed to catch liquids and absorb them into the pad itself, preventing liquids from reaching floor surfaces. A common problem is liquid contacting the pad too close to the edge, or in too much quantity, will run off the pad and onto the floor.

Current solutions to this spillover/holder problem are bulky, tub-style containment vessels with a mechanism for holding the absorbent pad in place within the tray. The current solutions are large, bulky, highly visible and time consuming to assemble, use and refill. The current products that have a liquid containment capability are considered drain pans or trays, with the primary function of holding the absorbent pad in place using a mechanical holding or attachment mechanism. The current products do not prevent the liquid from flowing off the pad and into or on the device itself.

A secondary problem with current solutions is that they are not adjustable in size to work with a wide range of absorbent pad sizes and proportions.

FIGS. 1 through 5 shows various conventional adsorbent pad frames 100, 102, 104, 106, 108. These frames, as discussed above, are bulky and are designed to have the absorbent pad placed inside. The side members are typically obtrusive and create a visibly unappealing display. Some conventional pad designs, especially those of FIG. 2, for example, create a confined space and/or require the animal to step up, making compliance with the use of the pad more difficult.

In view of the foregoing, there is a need for an improved absorbent pad frame assembly that addresses many of the above described problems with currently available solutions.

SUMMARY OF THE INVENTION

Embodiments of the present invention provide a frame for holding an absorbent pad, comprising a plurality of side members, each of the side members having an adjustable length; a plurality of corner members connecting adjacent side members to form a closed loop having an open central region; a receptacle disposed in each of the corner members; a hinged connector operable to hingedly connect and release from the receptacle, wherein the plurality of side members includes a sloped surface sloping upward from the open central region.

Embodiments of the present invention further provide a fluid containment device comprising a plurality of side members, each of the side members having an adjustable length, wherein each of the plurality of side members includes a sloped surface sloping upward from the open central region; a plurality of corner members connecting adjacent side members to form a closed loop forming the open central region; a receptacle disposed in each of the corner members; a hinged connector operable to hingedly connect and release from the receptacle; and an absorbent pad fitting within the open central region, the absorbent pad having absorbent pad edges extending upward along the sloped surfaces of the plurality of side members, the absorbent pad edges being sandwiched between the hinged connector and the receptacle, thereby retaining the absorbent pad therein.

Embodiments of the present invention also provide a method for collecting a fluid in an absorbent pad comprising disposing the absorbent pad in a frame, wherein the frame includes a plurality of side members, each of the side members having an adjustable length, wherein each of the plurality of side members includes a sloped surface sloping upward from the open central region, a plurality of corner members connecting adjacent side members to form a closed loop forming the open central region, a receptacle disposed in each of the corner members, and a hinged connector operable to hingedly connect and release from the receptacle; and adjusting a length of each of the plurality of side members so that an absorbent pad edge of the absorbent pad extends upward along the sloped surfaces.

In some embodiments, an anti-slip material on a bottom surface of the corner members and/or the side members to prevent slippage or sliding of the frame on a surface, such as a floor surface.

In some embodiments, at least 50% of the sloped surfaces of the plurality of side members is covered with the absorbent pad edges.

In some embodiments, all of the sloped surfaces are covered with the absorbent pad edges.

In some embodiments, the escape of pooling the fluid contained within the sloped surfaces when the fluid is disposed on the absorbent pad at a rate faster than can be absorbed thereby is prevented due to the absorbent pad being placed along the sloped surfaces of the side members.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
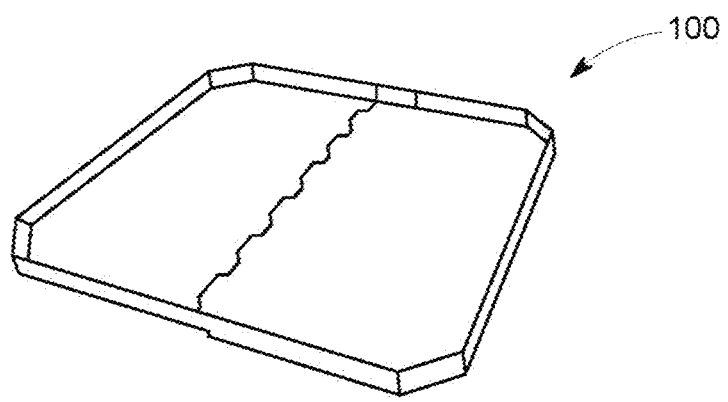
FIGS. 1 through 5 show various conventional absorbent pad retaining devices according to the prior art.
Figure 2:
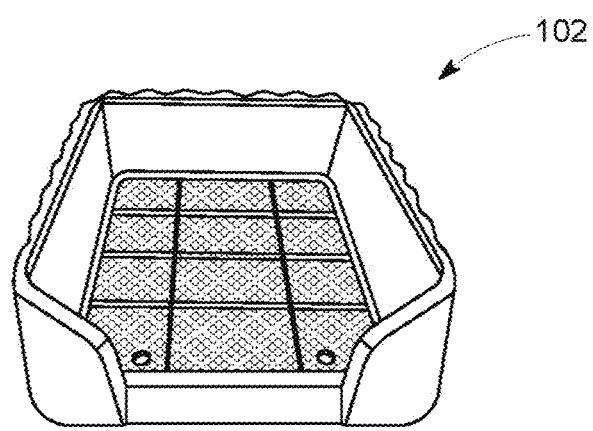
Figure 3:
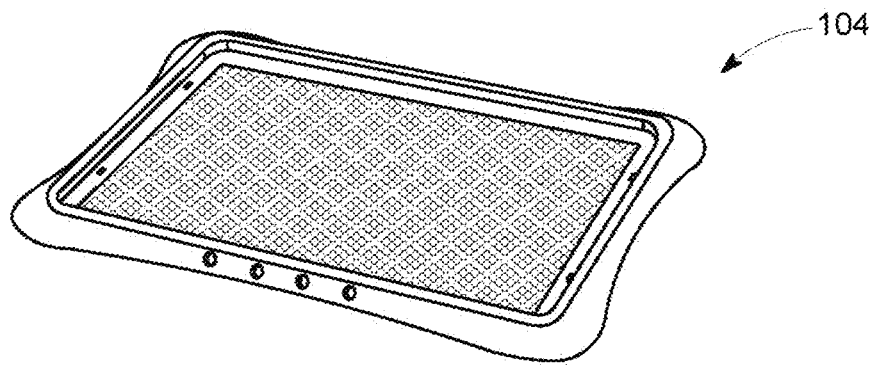
Figure 4:
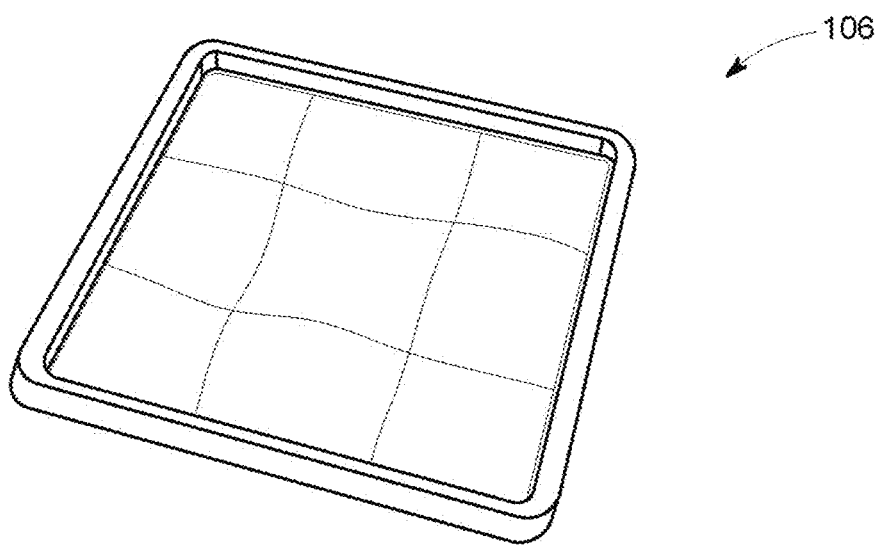
Figure 5:
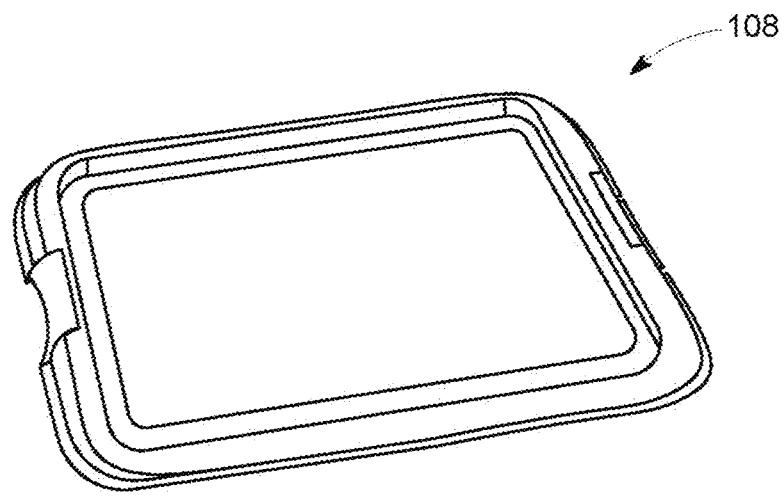

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an absorbent pad holder and containment system that includes a frame that can be adjustable in length on all sides to accommodate a varying range of absorbent pad dimensions. The frame design allows the absorbent area of the pad to remain flat while the ramped perimeter design of the frame and the corner attachment system holds the outer edge of the absorbent pad into an upward position. This creates a containment barrier for liquid that would normally flow over the edge of the pad and onto the floor surface. The perimeter design of the liner keeps the pad centered and provides flow of all liquid landing on the pad within the absorbent area of the pad.

Figure 6:
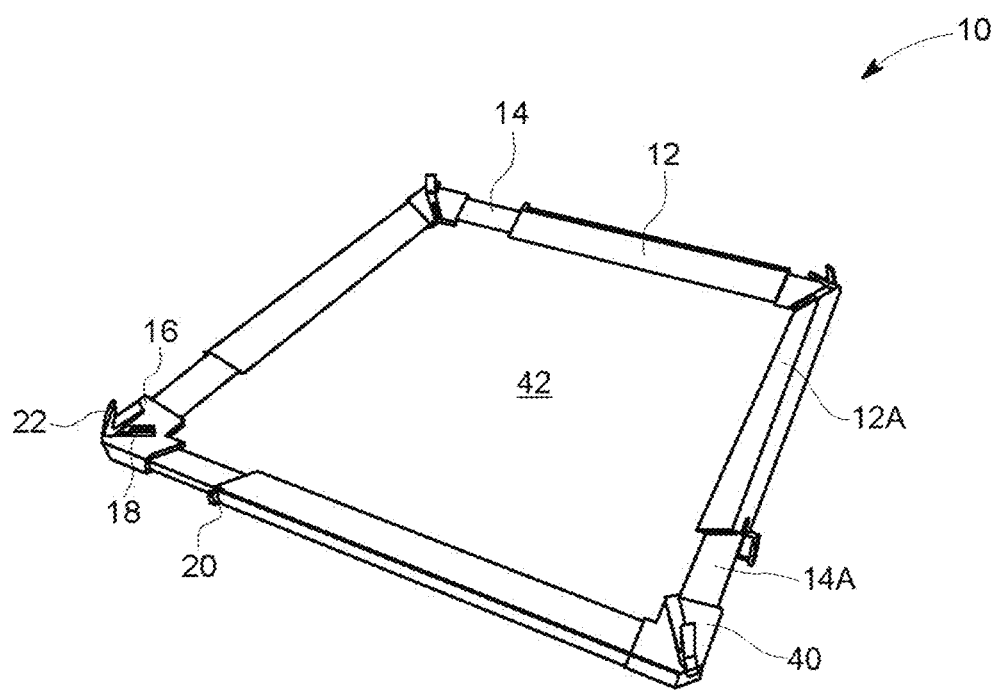
FIG. 6 is a perspective view of an absorbent pad frame according to an exemplary embodiment of the present invention.

Referring now to FIG. 6, an absorbent pad frame 10, or simple frame 10, can include a plurality of telescoping side members 12, 14 that may provide for adjustability of the dimensions of the frame 10 to support various sizes of absorbent pads. The side members 12, 14 can include sloped surfaces 12A, 14A that slope inward. The sloped surfaces 12A, 14A may slope upward at an angle from about 10 degrees to about 45 degrees, for example.

Corner members 40 may connect the side members 12, 14 to form the frame 10 having an outer perimeter and an open central region 42. In the embodiment of FIG. 6, the corner members connect the side members 12, 14 at a substantially 90-degree angle. However, other angles are contemplated within the scope of the present invention. For example, the frame 10 may be formed as an octagon with the corner members 40 forming a 45-degree angle. Regardless of the shape, the side members 12, 14 may be adjustable in size to allow for different dimensions.

Figure 7A:
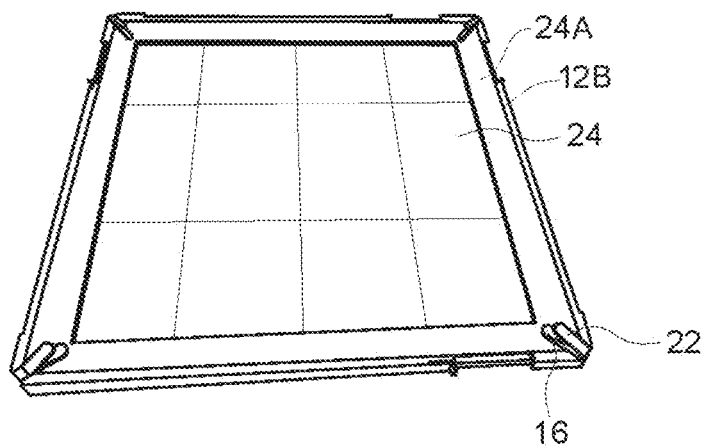
FIG. 7A is an end perspective view of the absorbent pad frame of FIG. 6, with the absorbent pad installed.

Each corner member 40 can include a connection that includes a fitting 18 formed in the corner member 40 with a hinged connector having a connector 16 fitting into the corner member fitting 18. Each connector 16 can include a shaped lever member 22 for assisting a user to release the connector 16 from the corner member fitting 18 when an absorbent pad edge 24A is sandwiched therebetween as shown in FIG. 7A. In some embodiments, especially where the side members 12, 14 are long (such as over 24 or 36 inches), a receptacle, similar to receptacle 18, may be formed along the side members 12, 14 with a hinged connector 16 fitting therein, thereby providing additional support to the absorbent pad edges 24A when assembled as shown in FIGS. 7A and 7B.

Figure 7B:
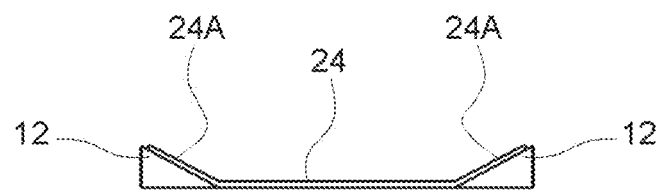
FIG. 7B is a cross sectional view of the absorbent pad frame and installed absorbent pad of FIG. 7A.

Referring to FIGS. 6, 7A and 7B, an absorbent pad 24 can be placed in the open central region 42 and the frame 10 can be adjusted so that the absorbent pad edges 24A are disposed along the sloped surfaces 12A, 14A of the side members 12, 14 (see FIG. 6). Typically, the absorbent pad edges 24A extend from about 50 to about 100% of the width of the sloped surfaces 12A, 14A, where an uncovered region 12B of the side members 12, 14 is typically less than ½ inch, even more typically less than ¼ inch. In some embodiments, the sloped surface 12A, 14A may be about ¾ to about 1.5 inches wide, terminating at a height of about ½ inch to about 1.5 inches off the floor surface.

The side members 12, 14 may adjust in various manners as may be understood by one skilled in the art. As discussed in greater detail below, the side members 12, 14 may telescope or slide along-side each other. In some embodiments, a toothed track may be disposed on one of the side members 12, 14 to provide resistance from the side members 12, 14 freely sliding against each other. Other mechanisms, such as tabs, slide locks, protrusions, buttons, and the like, may be used to provide size adjustments at regular intervals.

In some embodiments, at least a portion of a bottom surface of at least the corner members 40 may include a slip resistant coating, such as a rubber coating, footing, insert, pad, or the like. This coating on the bottom surface may help prevent slippage of the frame 10 on a floor surface.

Referring now to FIGS. 8 through 17, an exemplary design of an absorbent pad frame 80 is shown. While these drawings show specific examples, the present invention is not meant to be limited to the specifics shown in these Figures and described below.

Figure 8:
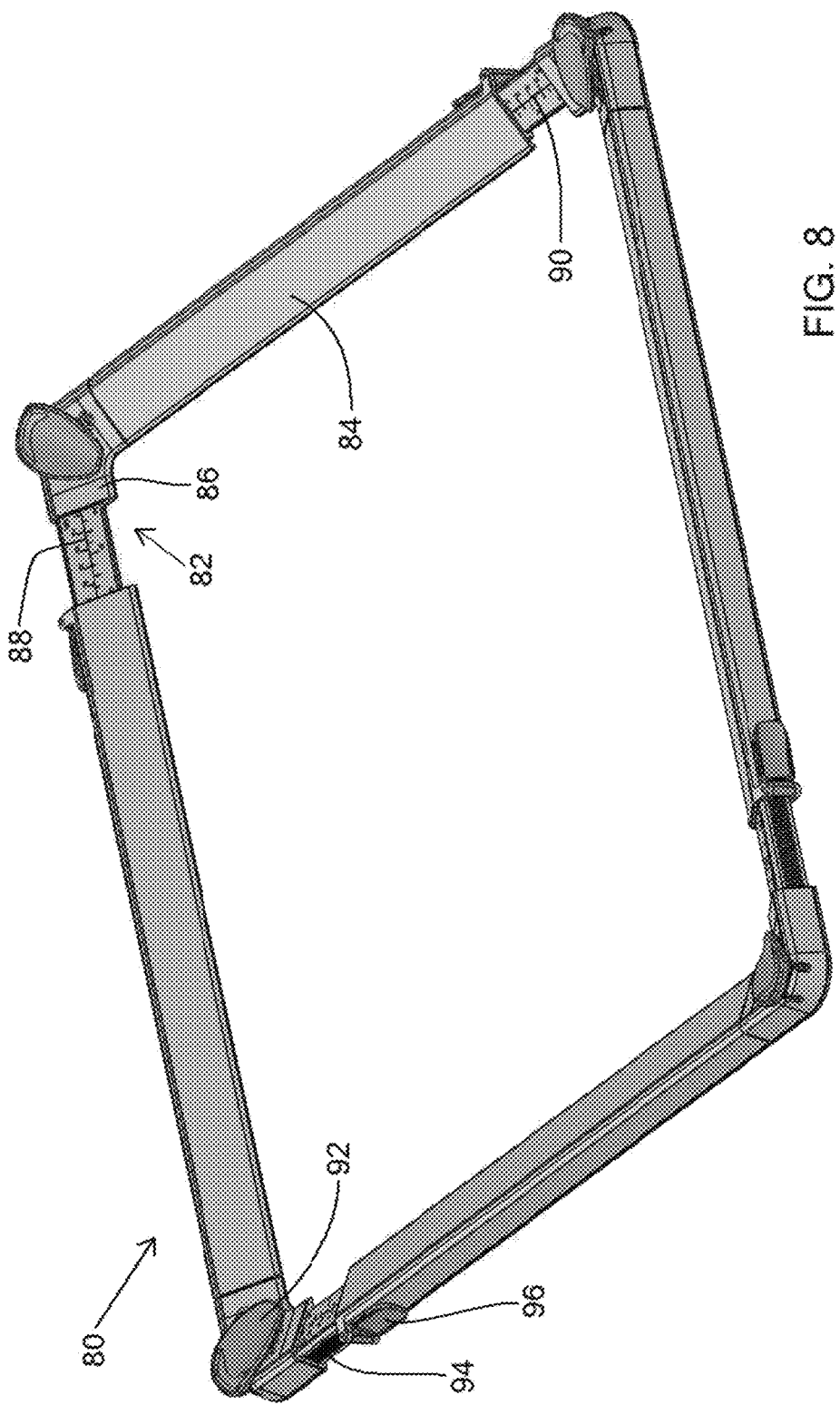
FIG. 8 is a perspective view of an absorbent pad frame according to an exemplary embodiment of the present invention.

FIG. 8 shows the frame 80 in its assembled form. A side and corner member 82 may include an inner frame member 88 attached to a corner 86. In some embodiments, the inner frame member 88 and the corner 86 may be formed as in integral member, while in other embodiments, the inner frame member 88 may be removably attached to the corner 86 by various means as may be known in the art. The inner frame member 88 may include a scale 90 disposed there-upon. The scale 90 may indicate, for example, the size of the absorbent pad that can fit within the frame 80.

An outer frame member 84 may be removable attached to the corner 86 of the frame and corner member 82, as discussed in greater detail below. The inner frame member 88 of the side and corner member 82 can telescoping engage into the outer frame member 84 to permit size adjustment of the frame 80. A locking tab 96, as described below, can lock the inner frame member 88 and the outer frame member 84 to a desired size.

Figure 9:
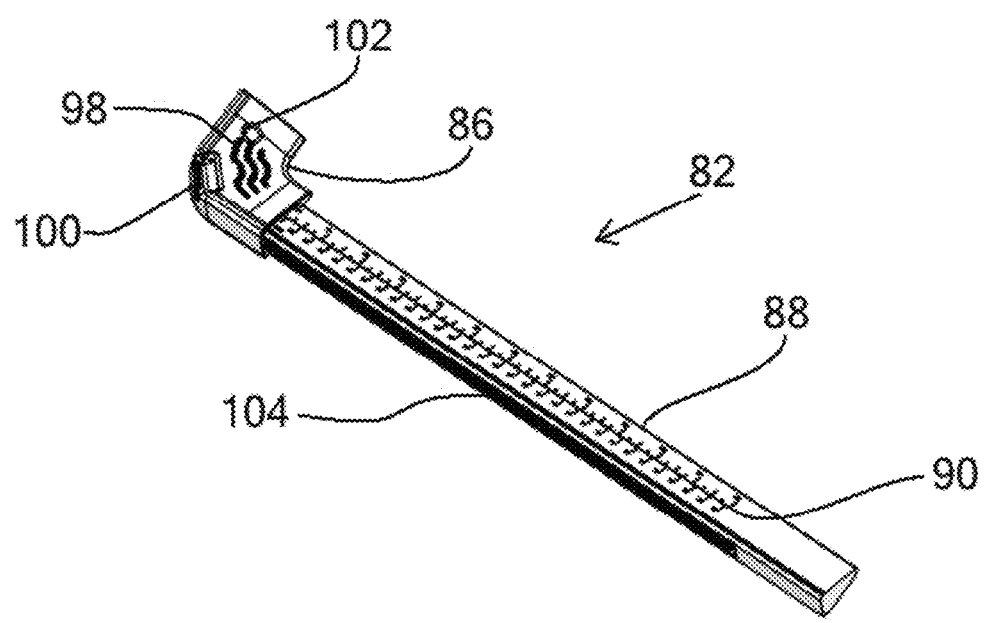
FIG. 9 is a perspective view of a side and corner member of the absorbent pad frame of FIG. 8.
Figure 10:
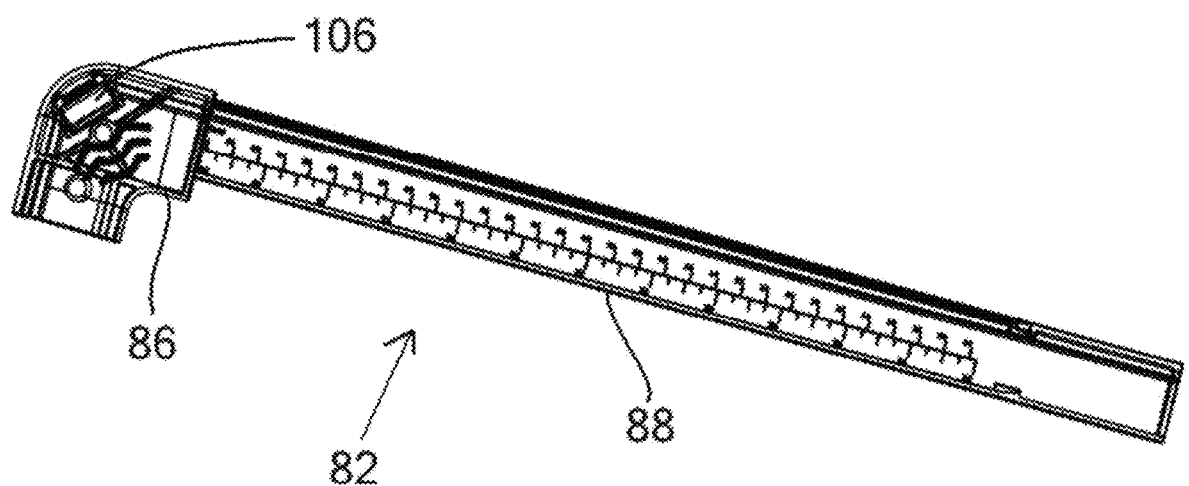
FIG. 10 is a top view of the side and corner member of FIG. 9.

FIGS. 9 and 10 show detail views of the side and corner member 82. A textured surface 104 may be provided along an outer side surface 94 (see FIG. 8) to engage the locking tab 94. A pad securing member receptacle 100 may hingingly receive a portion of a pad securing member 92 therein. A hole 102 in the corner 86 may receive a pin 134 (see FIG. 13) of the outer frame member 84. Slots 98 may be formed in the corner 86 to receive protrusions 154 (see FIG. 15) of the pad securing member 92. In some embodiments, a slip resistant member 106 may be disposed on a bottom side of the corner 86.

Figure 11:
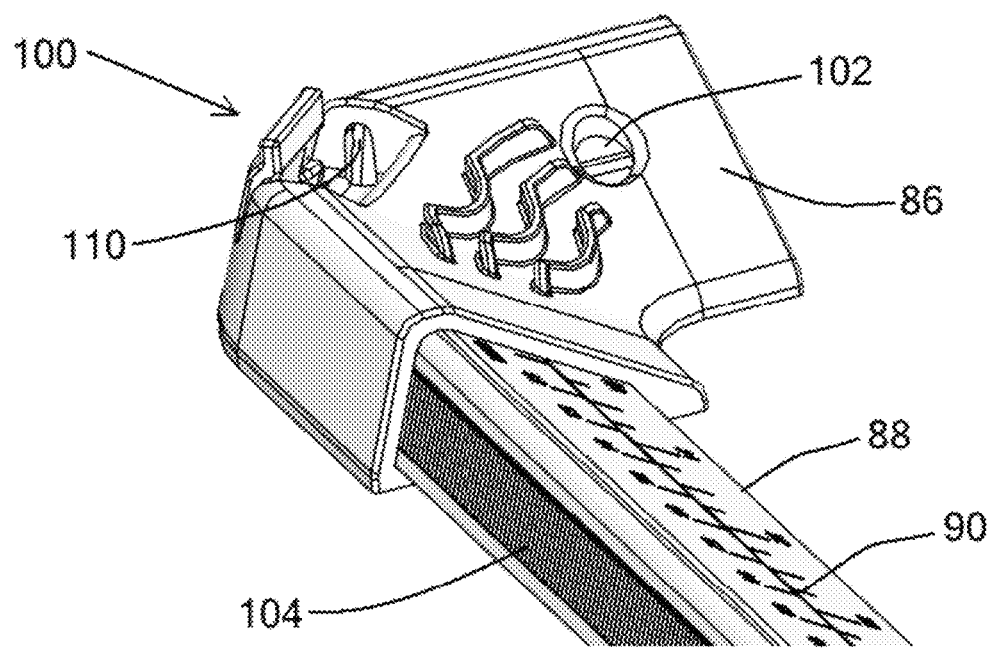
FIG. 11 is a detailed view of the side and corner member of FIG. 9.
Figure 12:
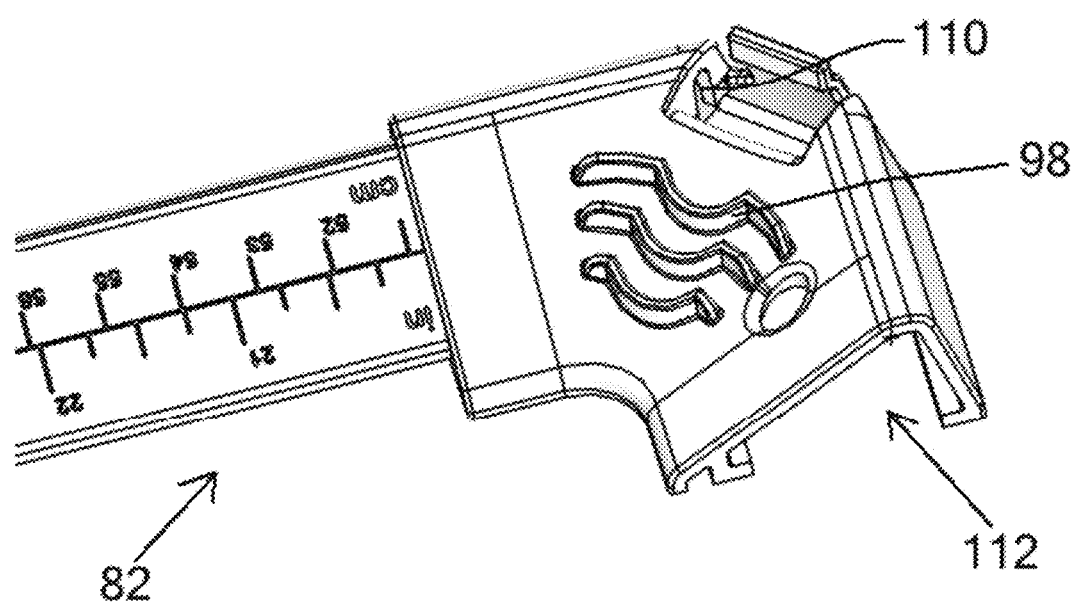
FIG. 12 is another detailed view of the side and corner member of FIG. 9.
Figure 13:
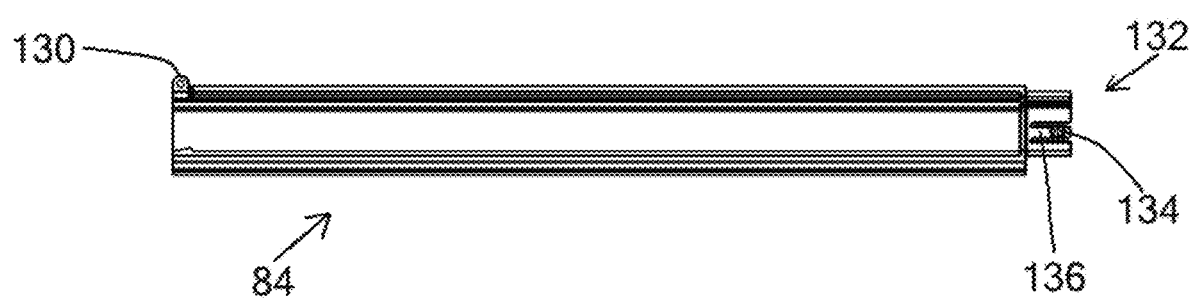
FIG. 13 is a top view of a side member of the absorbent pad frame of FIG. 8.

FIGS. 11 and 12 show detail views of the corner 86 of the side and corner member 82. The pad securing member receptacle 100 can include an opening 110 to receive a pin 152 (see FIG. 15) of the pad securing member 92. The outer frame member 84 can be inserted into a slot 112 of the corner 86, as shown in FIG. 12.

Figure 14:
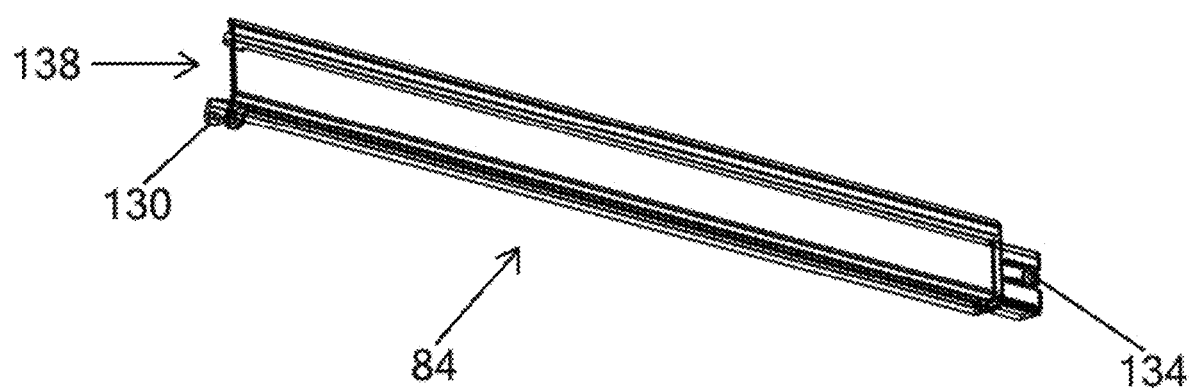
FIG. 14 is a perspective view of the side member of FIG. 13.

The outer frame member 84 can include an insertion end 132 having a resiliently bending member 136 having a pin 134 that fits into the opening 102 (see FIG. 11) of the corner 86 of the side and corner member 82. A locking tab mount 130 can be disposed at an end opposite the insertion end 132 for receiving a locking tab 170 (see FIG. 17) therein. The inner frame member 88 can telescopingly fit into an opening 138 as shown in FIG. 14.

Figure 15:
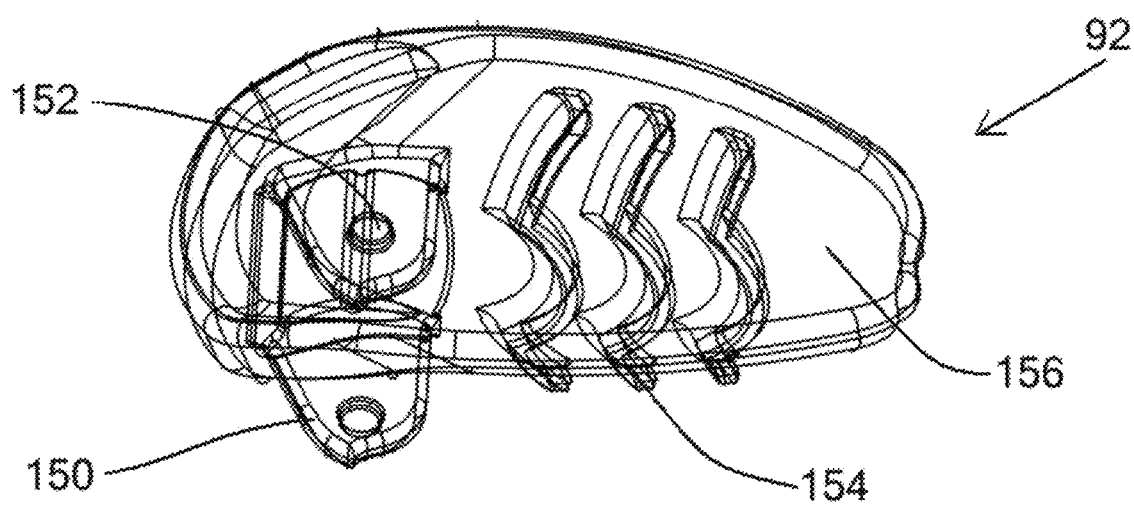
FIG. 15 is a bottom perspective view of a corner closure member of the absorbent pad frame of FIG. 8.

FIG. 15 shows the pad securing member 92 that can include pin extensions 150 to support pins 152 that fit into the openings 110 in the pad securing member receptacle 100 as shown in FIGS. 11 and 12. A bottom side 156 of the pad securing member 92 can include protrusions 154 that fit into the slots 98 of the corner, as described above, where a pad, as discussed, can be sandwiched between the pad securing member 92 and the corner 86 to secure the pad to the frame 80.

Figure 16:
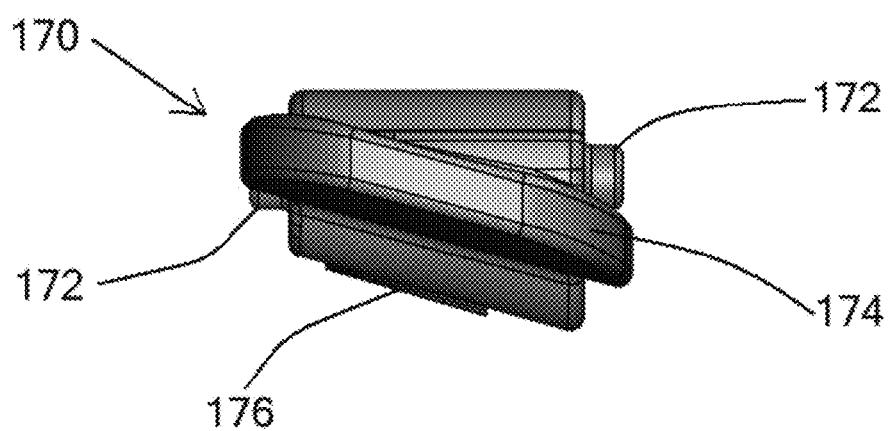
FIG. 16 is a front end view of a telescoping adjustment lock member of the absorbent pad frame of FIG. 8.
Figure 17:
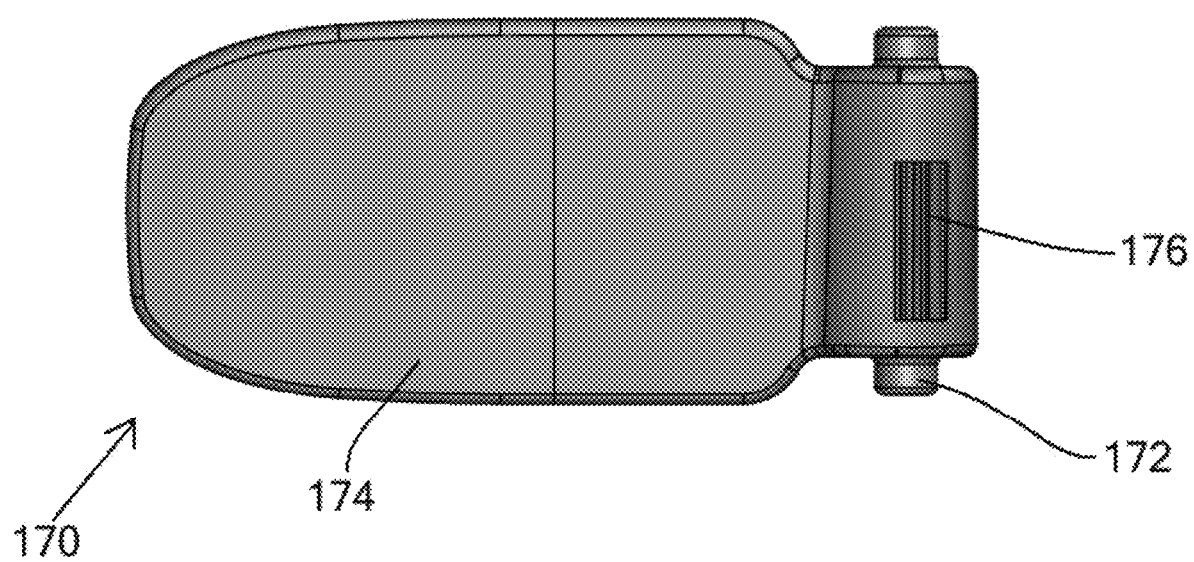
FIG. 17 is a bottom view of the telescoping adjustment lock member of FIG. 16.

FIGS. 16 and 17 show an example of a locking tab 170 (also described as locking tab 96, above) that has pins 172 that can fit into the locking tab mount 130 of the outer frame member 84. A locking tab textured surface 176 can engage the textured surface 104 of the inner frame member 88 for locking the telescoping action between the inner frame member 88 and the outer frame member 84. A main body 174 of the locking tab 170 provides a surface for locking and unlocking the locking tab 170. In some embodiments, the main body 174 may be twisted as shown in FIG. 16, to ease the use thereof.

Figure 18:
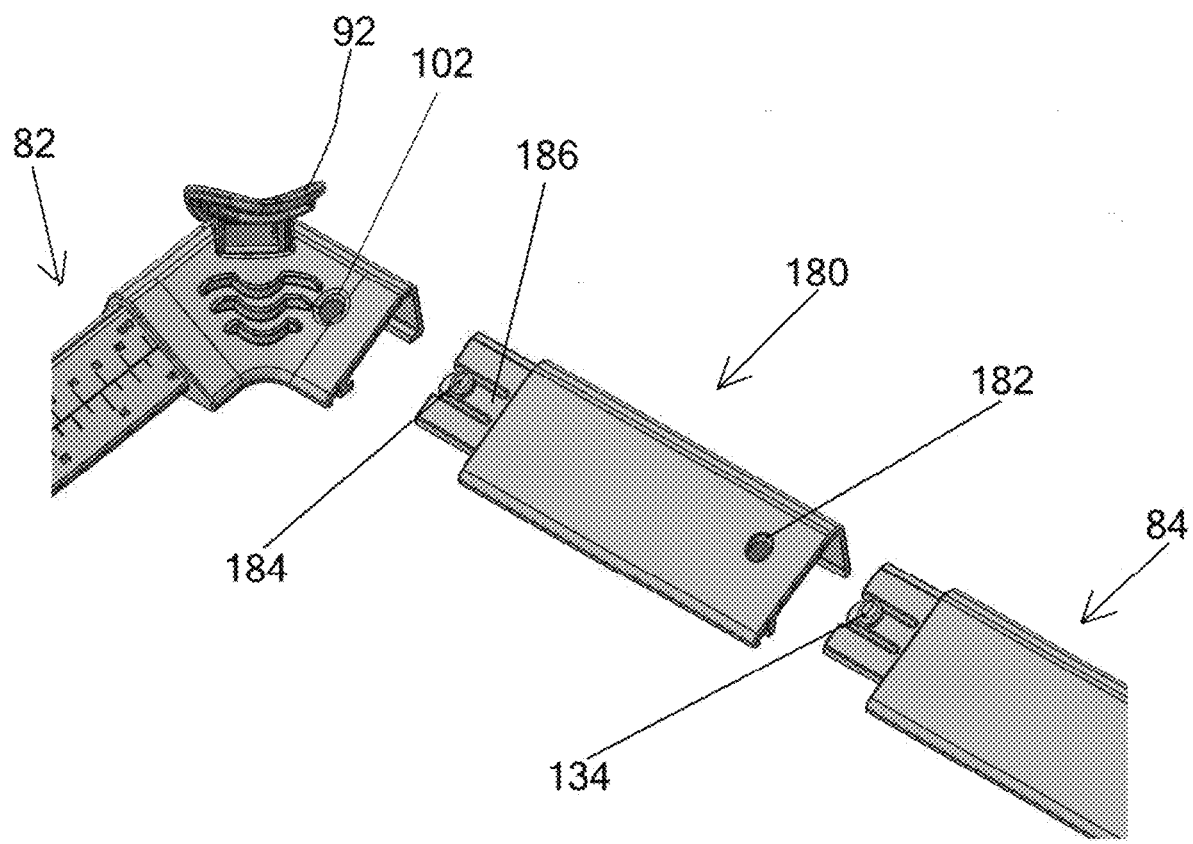
FIG. 18 is an exploded perspective view of an extender installed in the absorbent pad frame of FIG. 8.

Referring now to FIG. 18, in some embodiments, an extension member 180 can fit into the corner 86 of the side and corner member 82. The extension member 180 can include a pin 184 on a resiliently deforming tongue 186 for engagement into the hole 102 of the corner. The extension member 180 can include its own hole 182 for engagement with the pin 134 of the outer frame member 84. The length of the extension member 180 can vary, depending on application. In some embodiments, multiple extension members may be used end to end to provide an even longer size.

The frame 10 may be made from various materials. For example, the frame 10 may be formed from a durable plastic, metal, wood, composites, or combinations thereof, or the like. The frame 10 may be user-assembled by connecting each of the side members into corresponding corner members to form a closed loop. In this embodiment, the frame 10 may be readily assembled and disassembled into a relatively small footprint.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A frame for holding an absorbent pad, comprising:
   a plurality of side members, each of the side members having an adjustable length;
   a plurality of corner members connecting adjacent side members to form a closed loop having an open central region;
   a first retention member disposed in each of the corner members;
   a hinged connector having a second retention member engaging into and releasing from the first retention member to hold the absorbent pad therebetween, wherein
   the plurality of side members includes a sloped surface sloping upward from the open central region.

2. The frame of claim 1, where the corner member is formed integrally with one of the side members.

3. The frame of claim 1, wherein the side members include an inner side member telescoping inside an outer side member.

4. The frame of claim 3, wherein the inner side member is formed integrally with each of the corner members.

5. The frame of claim 4, further comprising a locking tab to lock a telescoping action between the inner side member and the outer side member.

6. The frame of claim 5, wherein the locking tab mounts to the outer side member and includes a locking tab textured surface for engaging against a textured surface of the inner side member.

7. The frame of claim 3, wherein the inner side member includes a graduation formed therein to indicate a size of the frame when assembled.

8. The frame of claim 1, wherein a bottom surface of the plurality of corner members include an anti-slip material.

9. The frame of claim 1, wherein the sloped surface has a width from about 0.75 to about 2 inches.

10. The frame of claim 9, wherein the sloped surface creates a rise from about 0.5 inch to about 1.5 inch.

11. The frame of claim 1, wherein the first retention member includes a plurality of slots.

12. The frame of claim 1, wherein the second retention member includes a plurality of protrusions.

13. A fluid containment device comprising:
    a plurality of side members, each of the side members having an adjustable length, wherein each of the plurality of side members includes a sloped surface sloping upward from the open central region;
    a plurality of corner members connecting adjacent side members to form a closed loop forming the open central region;
    a first retention member disposed in each of the corner members;
    a hinged connector having a second retention member engaging into and releasing from the first retention member to hold an absorbent pad therebetween, wherein
    the absorbent pad fits within the open central region, the absorbent pad having absorbent pad edges extending upward along the sloped surfaces of the plurality of side members, the absorbent pad edges being secured between the first and second retention members, thereby retaining the absorbent pad therein.

14. The fluid containment device of claim 13, wherein a bottom surface of the plurality of corner members include an anti-slip material.

15. The fluid containment device of claim 13, where the corner member is formed integrally with one of the side members.

16. The fluid containment device of claim 13, wherein the side members include an inner side member telescoping inside an outer side member.

17. The fluid containment device of claim 16, further comprising a locking tab to lock a telescoping action between the inner side member and the outer side member.

18. A method for collecting a fluid in an absorbent pad, comprising:
    disposing the absorbent pad in a frame, wherein the frame includes:
      a plurality of side members, each of the side members having an adjustable length, wherein each of the plurality of side members includes a sloped surface sloping upward from the open central region;
      a plurality of corner members connecting adjacent side members to form a closed loop forming the open central region;
      a first retention member disposed in each of the corner members;
      a hinged connector having a second retention member engaging into and releasing from the first retention member to hold the absorbent pad therebetween; and
    adjusting a length of each of the plurality of side members so that an absorbent pad edge of the absorbent pad extends upward along the sloped surfaces.

19. The method of claim 17, further comprising pooling the fluid contained within the sloped surfaces when the fluid is disposed on the absorbent pad at a rate faster than can be absorbed thereby.

20. The method of claim 17, further comprising directing the fluid downward toward the absorbent pad when the fluid is disposed at the sloped surfaces of the plurality of side members.

* * * * *